US006114022A

United States Patent [19]

Warner et al.

[11] Patent Number: 6,114,022

[45] Date of Patent: Sep. 5, 2000

[54] COATED MICROPOROUS INKJET RECEPTIVE MEDIA AND METHOD FOR CONTROLLING DOT DIAMETER

[75] Inventors: David Warner, Maplewood; Loren R. Schreader, White Bear Lake, both of Minn.

[73] Assignee: 3M Innovative Properties Company, St. Paul, Minn.

[21] Appl. No.: 08/909,021

[22] Filed: Aug. 11, 1997

[51] Int. Cl.[7] .............................. B32B 5/18; B41M 5/00; B05D 5/04

[52] U.S. Cl. .................................... 428/315.5; 428/315.9; 428/316.6; 428/317.3; 428/308.4; 428/331; 428/341; 428/343; 428/352; 347/105; 347/106; 427/261; 427/407.1

[58] Field of Search ............................. 428/304.4, 306.6, 428/308.4, 315.5, 315.9, 316.6, 317.1, 317.3, 331, 341, 343, 352, 409; 427/261, 407.1; 347/105, 106

[56] References Cited

U.S. PATENT DOCUMENTS

| | | | |
|---|---|---|---|
| 3,957,724 | 5/1976 | Schurb et al. . | |
| 3,997,702 | 12/1976 | Schurb et al. | 428/352 |
| 4,313,988 | 2/1982 | Koshar et al. | 428/40 |
| 4,379,804 | 4/1983 | Eisele et al. | 428/332 |
| 4,419,388 | 12/1983 | Sugiyama et al. | 427/288 |
| 4,474,847 | 10/1984 | Schröder et al. | 428/323 |
| 4,554,181 | 11/1985 | Cousin et al. | 427/261 |
| 4,567,073 | 1/1986 | Larson et al. | 428/40 |
| 4,605,592 | 8/1986 | Paquette et al. | 428/334 |
| 4,613,441 | 9/1986 | Kohno et al. | 210/500.36 |
| 4,614,190 | 9/1986 | Stanco et al. . | |
| 4,614,667 | 9/1986 | Larson et al. | 427/54.1 |
| 4,649,064 | 3/1987 | Jones | 427/256 |
| 4,726,989 | 2/1988 | Mrozinski | 428/315.5 |
| 4,732,786 | 3/1988 | Patterson et al. | 427/261 |
| 4,770,934 | 9/1988 | Yamasaki et al. | 428/331 |
| 4,781,985 | 11/1988 | Desjarlais | 428/421 |
| 4,833,172 | 5/1989 | Schwarz et al. | 521/62 |
| 4,861,644 | 8/1989 | Young et al. | 428/195 |
| 4,867,881 | 9/1989 | Kinzer | 210/490 |
| 4,903,041 | 2/1990 | Light | 346/1.1 |
| 4,904,519 | 2/1990 | Newman | 428/203 |
| 4,935,307 | 6/1990 | Iqbal et al. | 428/500 |
| 4,954,395 | 9/1990 | Hasegawa et al. | 428/318.4 |
| 5,002,825 | 3/1991 | Mimura et al. | 428/315.5 |
| 5,023,129 | 6/1991 | Morganti et al. | 428/195 |
| 5,045,386 | 9/1991 | Stan | 428/262 |
| 5,084,338 | 1/1992 | Light | 428/337 |
| 5,141,797 | 8/1992 | Wheeler | 428/195 |
| 5,202,190 | 4/1993 | Kantner et al. | 428/447 |
| 5,206,071 | 4/1993 | Atherton et al. | 428/195 |
| 5,208,092 | 5/1993 | Iqbal | 428/195 |
| 5,212,008 | 5/1993 | Malhotra et al. | 428/216 |
| 5,213,873 | 5/1993 | Yasuda et al. | 428/195 |
| 5,229,207 | 7/1993 | Paquette et al. | 428/355 |
| 5,238,618 | 8/1993 | Kinzer | 264/41 |
| 5,271,765 | 12/1993 | Ma | 106/22 D |
| 5,290,615 | 3/1994 | Tushaus et al. | 428/40 |
| 5,302,437 | 4/1994 | Idei et al. | 428/195 |
| 5,342,688 | 8/1994 | Kitchin et al. | 428/402 |
| 5,374,475 | 12/1994 | Wälchli | 428/304.4 |
| 5,389,723 | 2/1995 | Iqbal et al. | 525/57 |
| 5,429,860 | 7/1995 | Held et al. | 428/195 |
| 5,443,727 | 8/1995 | Gagnon | 210/490 |
| 5,521,002 | 5/1996 | Sneed | 428/331 |
| 5,605,750 | 2/1997 | Romano et al. | 428/304.4 |
| 5,686,602 | 11/1997 | Farooq et al. | 536/101 |
| 5,688,603 | 11/1997 | Iqbal et al. | 428/532 |
| 5,804,293 | 9/1998 | Nehmsmann et al. | 428/307.3 |
| 5,827,363 | 10/1998 | Darsillo et al. | 106/484 |
| 5,885,678 | 3/1999 | Malhotra | 428/41.8 |

FOREIGN PATENT DOCUMENTS

| | | |
|---|---|---|
| 0 484 016 A1 | 5/1992 | European Pat. Off. . |
| 0 570 515 B1 | 11/1993 | European Pat. Off. . |
| 0 810 086 A2 | 12/1997 | European Pat. Off. . |
| WO 92/07899 | 5/1992 | WIPO . |
| WO 96/08377 | 3/1996 | WIPO . |
| WO 97/17207 | 5/1997 | WIPO . |
| WO 97/20697 | 6/1997 | WIPO . |
| WO 97/22467 | 6/1997 | WIPO . |

OTHER PUBLICATIONS

Satas, Ed., *Handbook of Pressure Sensitive Adhesive Technology*, 2nd Ed., Table of Contents, Van Nostrand Reinhold (1989), pp. 168–171, (No Month).

Patent Abstracts of Japan—Publication No. 56148583; Publication Date Nov. 18, 1981.

*Primary Examiner*—Marie Yamnitzky
*Attorney, Agent, or Firm*—Dale A. Bjorkman

[57] ABSTRACT

An inkjet receptor medium wherein the medium is microporous and has on one major surface an imaging layer comprising a coating of a mixture of amorphous precipitated and fumed silicas and binder. Dot diameter of pigmented inkjet inks can be controlled using the receptor medium, which is advantageous for inks delivered in small picoliter volumes. Methods of making and using the medium are also disclosed.

26 Claims, No Drawings

COATED MICROPOROUS INKJET RECEPTIVE MEDIA AND METHOD FOR CONTROLLING DOT DIAMETER

FIELD OF INVENTION

This invention relates to inkjet receptive media that is coated in a manner that can control the spread of an ink droplet reaching the media to provide a superior image graphic.

BACKGROUND OF INVENTION

Image graphics are omnipresent in modern life. Images and data that warn, educate, entertain, advertise, etc. are applied on a variety of interior and exterior, vertical and horizontal surfaces. Nonlimiting examples of image graphics range from advertisements on walls or sides of trucks, posters that advertise the arrival of a new movie, warning signs near the edges of stairways.

The use of thermal and piezo inkjet inks have greatly increased in recent years with accelerated development of inexpensive and efficient inkjet printers, ink delivery systems, and the like.

Thermal inkjet hardware is commercially available from a number of multinational companies, including without limitation, Hewlett-Packard Corporation of Palo Alto, Calif., U.S.A.; Encad Corporation of San Diego, Calif., U.S.A.; Xerox Corporation of Rochester, N.Y., U.S.A.; LaserMaster Corporation of Eden Prairie, Minn., U.S.A.; and Mimaki Engineering Co., Ltd. of Tokyo, Japan. The number and variety of printers changes rapidly as printer makers are constantly improving their products for consumers. Printers are made both in desk-top size and wide format size depending on the size of the finished image graphic desired. Nonlimiting examples of popular commercial scale thermal inkjet printers are Encad's NovaJet Pro printers and H-P's 650C, 750C, and 2500CP printers. Nonlimiting examples of popular wide format thermal inkjet printers include H-P's DesignJet printers, where the 2500CP is preferred because it has 600×600 dots/inch (dpi) resolution with a drop size in the vicinity of about 40 picoliters.

3M markets Graphic Maker Inkjet software useful in converting digital images from the Internet, ClipArt, or Digital Camera sources into signals to thermal inkjet printers to print such image graphics.

Inkjet inks are also commercially available from a number of multinational companies, particularly 3M which markets its Series 8551; 8552; 8553; and 8554 pigmented inkjet inks. The use of four principal colors: cyan, magenta, yellow, and black (generally abbreviated "CMYK") permit the formation of as many as 256 colors or more in the digital image.

Media for inkjet printers are also undergoing accelerated development. Because inkjet imaging techniques have become vastly popular in commercial and consumer applications, the ability to use a personal computer to print a color image on paper or other receptor media has extended from dye-based inks to pigment-based inks. And the media must accommodate that change. Pigment-based inks provide more durable images because pigment particles are contained in a dispersion before being dispensed using a thermal inkjet print head.

Inkjet printers have come into general use for wide-format electronic printing for applications such as, engineering and architectural drawings. Because of the simplicity of operation and economy of inkjet printers, this image process holds a superior growth potential promise for the printing industry to produce wide format, image on demand, presentation quality graphics.

Therefore, the components of an inkjet system used for making graphics can be grouped into three major categories:

1 Computer, software, printer.

2 Ink.

3 Receptor medium.

The computer, software, and printer will control the size, number and placement of the ink drops and will transport the receptor medium through the printer. The ink will contain the colorant which forms the image and carrier for that colorant. The receptor medium provides the repository which accepts and holds the ink. The quality of the inkjet image is a function of the total system. However, the composition and interaction between the ink and receptor medium is most important in an inkjet system.

Image quality is what the viewing public and paying customers will want and demand to see. From the producer of the image graphic, many other obscure demands are also placed on the inkjet media/ink system from the print shop. Also, exposure to the environment can place additional demands on the media and ink (depending on the application of the graphic).

Current inkjet receptor media are direct coated with a dual layer receptor according to the disclosure contained in PCT International Patent Publication WO97/17207 (Warner et al.) and are marketed by 3M under the brands 3M™ Scotchcal™ Opaque Imaging Media 3657-10 and 3M™ Scotchcal™ Translucent Imaging Media 3637-20. Another inkjet receptor media is disclosed in copending, coassigned, U.S. patent application. Ser. No. 08/614,986 (Steelman et al.), now abandoned, which combines a hygroscopic layer on a hydrophilic microporous media.

Inkjet inks are typically wholly or partially water-based, such as disclosed in U.S. Pat. No. 5,271,765. Typical receptors for these inks are plain papers or preferably specialist inkjet receptor papers which are treated or coated to improve their receptor properties or the quality of the images resulting therefrom, such as disclosed in U.S. Pat. No. 5,213,873.

Many inkjet receptor compositions suitable for coating onto plastics to make them inkjet receptive have been disclosed. Applications for overhead transparencies are known in the art. These are composed of transparent plastic materials such as polyester, which alone will not accept the aqueous inks and are therefore coated with receptor layers. Typically these receptor layers are composed of mixtures of water soluble polymers which can absorb the aqueous mixture from which the inkjet ink comprises. Very common are hydrophilic layers comprising poly(vinyl pyrrolidone) or poly(vinyl alcohol), as exemplified by U.S. Pat. Nos. 4,379,804; 4,903,041; and 4,904,519. Also known are methods of crosslinking hydrophilic polymers in the receptor layers as disclosed in U.S. Pat. Nos. 4,649,064; 5,141,797; 5,023,129; 5,208,092; and 5,212,008. Other coating compositions contain water-absorbing particulates such as inorganic oxides, as disclosed in U.S. Pat. Nos. 5,084,338; 5,023,129; and 5,002,825. Similar properties are found for inkjet paper receptor coatings, which also contain particulates, such as corn starch as disclosed in U.S. Pat. No. 4,935,307 and 5,302,437.

The disadvantage that many of these types of inkjet receptor media suffer for image graphics is that they comprise water-sensitive polymer layers. Even if subsequently overlaminated still contain a water-soluble or water-swellable layer. This water-sensitive layer can be subject over time to extraction with water and can lead to damage of the graphic and liftoff of the overlaminate. Additionally, some of the common constituents of these hydrophilic coatings contain water-soluble polymers not ideally suitable to the heat and UV exposures experienced in exterior environments, thus limiting their exterior durability. Finally, the drying rate after printing of these materials appears slow since until dry, the coating is plasticized or even partially dissolved by the ink solvents (mainly water) so that the image can be easily damaged and can be tacky before it is dry.

In recent years increasing interest has been shown in microporous films as inkjet receptors to address some or all of the above disadvantages. Both Warner et al. and Steelman et al. applications identified above disclose microporous films to advantage. If the film is absorbant to the ink, after printing the ink absorbs into the film itself into the pores by capillary action and feels dry very quickly because the ink is away from the surface of the printed graphic. The film need not necessarily contain water-soluble or water swellable polymers, so potentially could be heat and UV resistant and need not be subject to water damage.

Porous films are not necessarily receptive to water-based inkjet if the material is inherently hydrophobic and methods of making them hydrophilic have been exemplified e.g. by PCT Publication WO 92/07899.

Other films are inherently aqueous ink absorptive because of the film material, e.g. Teslin™ (a silica-filled polyolefin microporous film) available from PPG Industries and of the type exemplified in U.S. Pat. No. 4,861,644. Possible issues with this type of material are that if used with dye based inks image density can be low depending on how much of the colorant remains inside the pores after drying. One way of avoiding this is to fuse the film following printing as exemplified in PCT Publication WO 92/07899.

Other methods are to the coat the microporous film with a receptor layer as disclosed in copending, coassigned, U.S. patent application Ser. No. 08/614,986 (Steelman et al.), now abandoned, and U.S. Pat. No. 5,605,750.

As stated above, the relationship between the ink and the media is key to image graphic quality. With printers now reaching 600×600 dpi precision, inkjet drop size is smaller than in the past. As stated previously, a typical drop size for this dpi precision, is about 40 picoliters, which is one-third the size of prior drop sizes of 140 picoliters used in wide format inkjet printers. Printer makers are striving for even smaller drop sizes, e.g., 10–20 picoliters. With pigmented inkjet inks, drop size determines the quantity of pigment particles that reside in each drop and are to be directed to a predetermined area of media.

When the inkjet ink drop contacts the receptor medium, a combination of two things occur. The inkjet drop diffuses vertically into the medium and diffuses horizontally along the receptor surface, with a resulting spread of the dot.

However, with pigment-based inkjet inks of the right particle size and if used with a film of the right pore-size, some filtration of the colorant is possible at the surface of the film resulting in a good density and color saturation. However, images can still be very poor if dot-gain is low due to "banding phenomena" where insufficient ink remains to generate the appropriate halftone image. If dot-size is too small, then errors due to media advancement or failed printhead nozzles can cause banding. This problem would not be seen with larger drop size printers because larger dots could cover up prior printing errors. However, if dots are too large, then edge acuity is lost. Edge acuity is a reason for increased dpi image precision. Ability to control dot diameter is therefore an important property in an inkjet receptor medium.

U.S. Pat. No. 5,605,750 exemplifies a pseudo-boehmite coating applied to the silica-filled microporous film such as Teslin™. The coating contains alumina particles of pseudo-boehmite of pore radius 10 to 80 Å. Also disclosed is an additional protective layer of hydroxypropylmethyl cellulose.

SUMMARY OF INVENTION

This invention has utility for the production of graphics using wide format inkjet printers and pigment-based ink. This invention solves the problem of banding in fine precision inkjet printing systems by controlling the dot diameter of a small inkjet drop on an inkjet receptor medium.

One aspect of the invention is an inkjet receptor medium comprising a microporous medium having on one major surface an imaging layer comprising a coating of amorphous precipitated silica and binder. The binder is preferably a water-based ethylene-acrylic acid dispersion, and other organic liquids. The coating also preferably comprises a mixture of amorphous precipitated and fumed silicas.

The imaging layer is constructed applying a range of weight ratio of silica to binder and applied in a range of coating weights such that the dried layer is capable of controlling the dot diameter of pigmented inkjet inks. Specifically, the dot diameter of pigment particles in a single inkjet drop can be controlled to minimize undesired banding of ink on the inkjet receptor medium.

Using the present invention as compared with the substrate with no imaging layer, one can increase dot diameter for different color inks by controlling the silica/binder weight ratio.

Another aspect of the invention is a method of coating an imaging layer on a microporous medium, wherein the layer comprises a coating of a mixture of amorphous precipitated and fumed silicas and binder, in order to form an inkjet receptor medium; and printing an inkjet ink drop on the inkjet receptor medium wherein a dot formed on the medium, containing pigment particles gains in size on the imaging layer.

A feature of the invention is the retention of pigment particles at or near the imaging surface of the receptor medium while allowing carrier liquids of the ink to be transported through the microporous medium.

Another feature of the invention is the interaction of the imaging layer with the pigment particles in the ink to enhance the appearance of dot diameter with a minimal drop size currently available.

An advantage of the invention is the ability to maximize the appearance of a minimal drop size by impelling the dot on the receptor medium to spread horizontally along the medium while the carrier liquid is impelled to drain vertically through the medium. Using the medium of the present invention, one can take a drop of minimal volume and maximize the usage of pigment particles to be seen in the image, without adversely affecting visual acuity. Without control of dot diameter, pigment particles "stack up" where deposited on the medium. With dot diameter control of the present invention, one can control the spread of pigment particles over a larger area of the medium's imaging surface, without loss of visual acuity.

Another advantage of the invention is ability to minimize errors in the appearance of an image graphic where the printer and ink employ maximum dpi currently available.

Other features and advantages will be explained in relation to the following embodiments of the invention.

EMBOSIMENTS OF THE INVENTION

Microporous Material

The inkjet receptive medium begins with microporous film or membrane that has an imaging major surface and an opposing major surface. The material is preferably hydrophilic and capable of transporting carrier liquids in ink away from the imaging major surface.

Microporous membranes are available with a variety of pore sizes, compositions, thicknesses, and void volumes. Microporous membranes suitable for this invention preferably have adequate void volume to fully absorb the inkjet ink discharged onto the hydrophilic layer of the inkjet recording medium. It should be noted that this void volume must be accessible to the inkjet ink. In other words, a microporous membrane without channels connecting the voided areas to the imaging surface coating and to each other (i.e., a closed cell film) will not provide the advantages of this invention and will instead function similarly to a film having no voids at all.

Void volume is defined in ASTM D792 as the (1-Bulk density/Polymer density)*100. If the density of the polymer is not known, the void volume can be determined by saturating the membrane with a liquid of known density and comparing the weight of the saturated membrane with the weight of the membrane prior to saturation. Typical void volumes for hydrophilic, microporous, polymeric membrane range from 10 to 99 percent, with common ranges being 20 to 90%.

Void volume combined with membrane thickness determines the ink volume capacity of the membrane. Membrane thickness also affects the flexibility, durability, and dimensional stability of the membrane. Membrane 12 can have a thickness ranging from about 0.01 mm to about 0.6 mm (0.5 mil to about 30 mils) or more for typical uses. Preferably, the thicknesses are from about 0.04 mm to about 0.25 mm (about 2 mils to about 10 mils).

The liquid volume of typical inkjet printers is approximately 40 to 150 picoliters per drop, although it is contemplated that printers will eventually have drop sizes of 10–20 picoliters, which should also benefit from this invention. Thus, this invention is useful for drop sizes of less than 150 picoliters. Typical resolution is 118 to 283 drops per centimeter. High resolution printers supply smaller dot volumes. Actual results indicate a deposited volume of 1.95 to 2.23 microliters per square centimeter with each color. Solid coverage in multicolor systems could lead to as high as 300% coverage (using undercolor removal) thus leading to volume deposition of 5.85 to 6.69 microliters per square centimeter.

Hydrophilic, microporous, polymeric membrane has a pore size that is less than the nominal drop size of the inkjet printer in which the inkjet recording medium is to be used. The pore size may be from 0.01 to 10 micrometers with a preferred range of from 0.5 to 5 micrometers with pores on at least one side of the sheet.

The porosity, or voided aspect, of membrane need not go through the entire thickness of the membrane, but only to a sufficient depth to create the necessary void volume. Therefore, the membrane may be asymmetric in nature, such that one side possesses the aforementioned properties, and the other side may be more or less porous or non-porous. In such a case, the porous side must have adequate void volume to absorb the liquid in the ink that is passed through the imaging layer.

Nonlimiting examples of hydrophilic, microporous, polymeric membranes include polyolefins, polyesters, polyvinyl halides, and acrylics with a micro-voided structure. Preferred among these candidates are a microporous membrane commercially available as "Teslin" from PPG Industries as defined in U.S. Pat. No. 4,833,172 and hydrophilic microporous membranes typically used for microfiltration, printing or liquid barrier films as described in U.S. Pat. Nos. 4,867,881, 4,613,441, 5,238,618, and 5,443,727, which are all incorporated by reference as if rewritten herein. Teslin microporous membrane has an overall thickness of approximately 0.18 mm, and the void volume has been measured experimentally to be 65.9%. The ink volume capacity of the membrane is thus 11.7 microliters per square centimeter. Therefore, this membrane has sufficient void volume combined with thickness to fully absorb the ink deposited by most inkjet printers, even at 300% coverage, without considering the amount retained in the hygroscopic layer.

Membrane can optionally also include a variety of additives known to those skilled in the art. Nonlimiting examples include fillers such as silica, talc, calcium carbonate, titanium dioxide, or other polymer inclusions. It can further include modifiers to improve coating characteristics, surface tension, surface finish, and hardness.

Membrane can be used as commercially provided or calendered. Calendering of the membrane can be performed using conventional material handling equipment and pressures such that calendering results in a calendered medium that has higher gloss after calendering as opposed to before calendering. It is acceptable to calender the medium such that the 85° gloss measurement is between about 15 units and 35 units as measured on a Byk-Gardner Gloss Meter, and preferably between about 20 units and about 35 units. It is preferred to calender the membrane after coating with the imaging layer, although it is possible to calender prior to the membrane being coated.

Imaging Layer

The imaging layer comprises a binder and amorphous precipitated silica, and preferably a mixture of at least a binder and amorphous precipitated and fumed silicas.

The weight percent ratio of silica to binder can range from about 3.5:1 to about 2:1 and preferably from about 3.0:1 to about 2.25:1. The preferred range has been found to maximize dot diameter without harming visual acuity for the image graphic printed on the receptor medium.

The coating weight (dried on the microporous medium) can range from about 10 to about 300 mg/ft$^2$ (108 to 3300 mg/m$^2$) and preferably from about 30 to about 200 mg/ft$^2$ (330 to 2200 mg/m$^2$). The preferred range has been found to maximize dot diameter without harming visual acuity.

The binder can be any polymer from water-based or organic solvent-based systems that can be coated onto the microporous material and can adhere to the material with the silica particles contained therein. Preferably, the binder is water-resistant, yet can be coated from a water-based dispersion. Nonlimiting examples of such binders include ethylene-acrylic acid copolymers and their salts, styrene-acrylic acid copolymers and their salts, and other (meth) acrylic moiety containing polymers. Preferably, the binder is a water-based ethylene-acrylic acid dispersion commercially available as Michem Prime 4983R resin from Michelman Inc., 9080 Shell Road, Cincinnati, Ohio 45236-1299).

The binder retains silicas in the imaging layer. Silicas have been found to interact with pigment particles in the ink and any dispersants associated with the pigment particles. Silicas useful in the invention include amorphous precipitated silicas alone or in mixture with fumed silicas.

Such silicas have typical primary particle sizes ranging from about 15 nm to about 6 $\mu$m. These particle sizes have great range, because two different types of silicas are useful in the present invention. The optional fumed silicas have a much smaller particle size than the amorphous precipitated silicas and typically constitute the lesser proportion of the mixture of silicas when both are present. Generally when both are present in the mixture, the weight ratio of silicas (amorphous:fumed) ranges greater than about 1:1 and preferably greater than about 3:1.

Amorphous precipitated silicas are commercially available such sources as FK-3 10 silicas from Degussa Corporation of Ridgefield Park, N.J., U.S.A.

Fumed silicas are commercially available as Cab-o-sil silicas from Cabot Corp. of Tuscola, Ill., U.S.A. and Aerosil MOX 170 silicas from Degussa Corporation of Ridgefield Park, N.J., U.S.A.

Control of dot diameter can be obtained by variation of the silica/binder weight ratio. As compared with a control of substrate without the imaging layer thereon, and by varying the silica to binder weight percent ratio from about 2.0:1 to about 3.5:1, one can increase dot diameter in a range from about 32% to about 83% for cyan ink; about 55% to about 104% for magenta ink; about 29% to about 48% for yellow ink; and about 35% to about 90% for black ink. The variation of increase depends on ink formulations as well as the silica to binder weight ratio. But one skilled in the art will appreciate the versatility and utility of adjustments in silica/binder weight ratio to achieve the advantages of the present invention.

Optional Adhesive Layer and Optional Release Liner

The receptor medium optionally but preferably has an adhesive layer on the opposite major surface of the microporous material that is also optionally but preferably protected by a release liner. After imaging, the receptor medium can be adhered to a horizontal or vertical, interior or exterior surface to warn, educate, entertain, advertise, etc.

The choice of adhesive and release liner depends on usage desired for the image graphic.

Pressure sensitive adhesives can be any conventional pressure sensitive adhesive that adheres to both membrane and to the surface of the item upon which the inkjet receptor medium having the permanent, precise image is destined to be placed. Pressure sensitive adhesives are generally described in Satas, Ed., *Handbook of Pressure Sensitive Adhesives* 2nd Ed. (Von Nostrand Reinhold 1989), the disclosure of which is incorporated by reference. Pressure sensitive adhesives are commercially available from a number of sources. Particularly preferred are acrylate pressure sensitive adhesives commercially available from Minnesota Mining and Manufacturing Company of St. Paul, Minn. and generally described in U.S. Pat. Nos. 5,141,797, 4,605,592, 5,045,386, and 5,229,207 and EPO Patent Publication EP 0 570 515 B1 (Steelman et al.).

Release liners are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, urethanes, and long chain alkyl acrylates, such as defined in U.S. Pat. No. 3,957,724; 4,567,073; 4,313,988; 3,997,702; 4,614,667; 5,202,190; and 5,290,615; the disclosures of which are incorporated by reference herein and those liners commecially available as Polyslik brand liners from Rexam Release of Oakbrook, Ill., U.S.A. and EXHERE brand liners from P. H. Glatfelter Company of Spring Grove, Pa., U.S.A.

Method of Making the Imaging Layer

Coating can be carried out using dispersions of between 0.5% and 6% approximately solids at a 0.002 inch (0.051 mm) wet gap on a knife (notch bar) coater or equivalent (e.g. at 3 mil (0.76 mm) between 0.3% and 4% etc.) or using gravure coating onto either Teslin™ film, or constructions containing Teslin™ such as Teslin/adhesive/release liner laminates which can be assembled using adhesives and lamination or coating procedures known in the art. Preferably, to avoid foaming during coating up to 12.5% of a solvent such as methyl ethyl ketone can be added to solutions between 1.0 and 1.4% solids.

In one embodiment of the method, one can construct the receptor medium from coating adhesive on a release liner, laminating the microporous material, coating and calendering the imaging layer.

In another embodiment of the method, one can laminate the microporous material on an adhesive on a transfer liner and then transfer to the final release liner either before or after calendering and either before or after coating on the imaging layer.

Preferably, the order of assembly is the first embodiment.

Usefulness of the Invention

Inkjet receptor media of the present invention can be employed in any environment where inkjet images are desired to be precise, stable, and rapid drying. Commercial graphic applications include opaque signs and banners.

Inkjet recording media of the present invention have dimensional stability, after calendering, as measured by hygroscopic expansion of less than 1.5% size change in all directions with a relative humidity change from 10% relative humidity to 90% relative humidity. As such, the media of the present invention are preferred over coated papers because the paper is apt to change shape or dimension during processing or during use.

Inkjet receptor media of the present invention can accept a variety of inkjet ink formulations to produce rapid drying and precise inkjet images. The thickness and composition of the individual layers of the inkjet recording medium can be varied for optimum results, depending on several factors, such as: ink droplet volume; ink liquid carrier composition; ink type (pigment or blend of pigment and dye); and manufacturing technique (machine speed, resolution, roller configuration); etc.

Commonly, inkjet ink formulations have pigments in water blended with other solvents. Both water and the other solvents carry the pigments into the imaging layer and then continue into membrane for rapid drying of the image in the imaging layer to form the precise image.

The imaging layer of the present invention has been found to control dot diameter over a range of silica/binder weight ratios and dried coating weight range disclosed above. Surprisingly, it has been found that dot diameter can reach a peak of up to about 150 $\mu$m on a printer that delivers drop volumes of about 40 picoliters at 600 dpi when the weight percent ratio of silica/binder is about 2.75:1 and the dried coating weight is about 130 mg/ft$^2$ (1430 mg/M$^2$). Variation of either parameter substantially in either direction will reduce the amount of dot diameter. One skilled in art can employ any possible combination of the acceptable ratios and dried coating weights to control dot diameter to minimize banding or undesirable imaging defects.

For example, one can increase the silica/binder ratio to about 3:1 and reduce the dried coating weight to about 32 mg/ft$^2$ (352 mg/$^2$) to achieve dot diameter that is about 75–92% less than the peak dot diameter, the range depending on which color of ink is employed.

For example, one can reduce the silica/binder ratio to about 2:1 and the dried coating weight remains the same to achieve dot diameter that is about the same as at the peak dot diameter but has less visual acuity.

Drying can be measured as the time required before the image becomes tack free or does not smear when lightly rubbed. Typically, the image feels dry within about 2 minutes and preferably within about 30 seconds after imaging. The use of the imaging layer to provide dot diameter and the use of the microporous medium to provide quick drying of the image are advantages combined in the receptor medium of the invention not previously found in the art.

Dot size, and hence dot diameter relative to an uncoated microporous material, can be measured using a Jenavert optical microscope at 625 times magnification with a graduated eyepiece. The eyepiece had previously been calibrated for microns image size per eyepiece graduated division. Dots as near circular as possible can be selected, and three dots per color being measured along orthogonal axes for dot diameter. All six diameters per dot color can be averaged to find the final diameter for that color dot.

Dot diameter can range from about 70 to about 150 $\mu$m and preferably from about 80 to about 120 $\mu$m for each printing color in order to minimize banding. Using an imaging layer according to the present invention, this goal can be achieved even when printing drops as small as 40 picoliters in volume.

The formation of precise inkjet images is provided by a variety of commercially available printing techniques. Nonlimiting examples include thermal inkjet printers such as DeskJet brand, PaintJet brand, Deskwriter brand, DesignJet brand, and other printers commercially available from Hewlett Packard Corporation of Palo Alto, Calif. Also included are piezo type inkjet printers such as those from Seiko-Epson, spray jet printers and continuous inkjet printers. Any of these commercially available printing techniques introduce the ink in a jet spray of a specific image into the medium of the present invention. Drying is much more rapid under the present invention than if the imaging layer were to be applied to a similar non-porous media.

The media of the present invention can be used with a variety of inkjet inks obtainable from a variety of commercial sources. It should be understood that each of these inks have different formulations, even for different colors within the same ink family. The effect of controlling dot diameter according to the present invention can have varying results among various ink formulations, even within different colors. Therefore, some inks may require this method of the present invention more than others. Nonlimiting sources include Minnesota Mining and Manufacturing Company, Encad Corporation, Hewlett Packard Corporation, and like. These inks are preferably designed to work with the inkjet printers described immediately above and in the background section above, although the specifications of the printers and the inks will have to be reviewed for appropriate drop volumes and dpi in order to further refine the usefulness of the present invention. For example, banding issues can be addressed well in "40 picoliter" printers using the present invention. However, there could be other issues addressed in "larger drop volume" printers using the present invention. Because a feature of the present invention is the ability to control drop diameter, the ability to tailor specific media for specific inks and specific printers is achievable.

The following examples further disclose embodiments of the invention.

EXAMPLES

R is defined as the ratio of total weight of silica to resin in the dry coating.

Example 1 - Preparation of Imaging Layer

Stock solution of premix paste at 22% solids

To a beaker was added Michem Prime 4983R (58.90 g) available from Michelman Inc., 9080 Shell Road, Cincinnati, Ohio 45236-1299). Deionized water was added (14.99 g) and the dispersion stirred. To the stirred water-based dispersion was added ethanol (46.61 g). After mixing for a short time the dispersion was vigorously mixed and fumed silica Aerosil MOX 170 (9.53 g) and amorphous precipitated silica FK-310 (30.97 g) added in that order (both silicas available from Degussa Corporation, 65 Challenger Road, Ridgefield Park, N.J.).

The mixture was homogenized using a Silverson high-speed Multi-Purpose Lab mixer, fitted with a Disintegrating Head for five minutes.

The 22% premix paste was diluted with successive dilutions of an equal weight of ethanol-water mix (38 g deionized water to 12 g ethanol) to get solutions of the following percent solids: 5.5%, 2.75%, 1.375% and 0.6875%. To avoid settling of the silica which would alter the results (by altering the binder to silica ratio) the solutions need to be coated immediately.

Example 2 - Preparation of a Variety of Silica/Binder Formulations

The following formulations at 11% solids in the table were made up as described in example 1. They were diluted one part by weight solution to one part by weight solvent mix (38 g deionized water, 12 g ethanol) and coated immediately.

TABLE 1

Formulations with varying R ratio

| R | Michem Prime 4983R | Silica MOX 170 | Silica FK 310 | Ethanol | Water | Total |
|---|---|---|---|---|---|---|
| 2 | 35.8135 | 4.331 | 14.07573333 | 53.1881 | 142.591667 | 251 |
| 2.25 | 33.98169231 | 4.497576923 | 14.61710769 | 53.1881 | 144.715523 | 251 |
| 2.5 | 31.55442857 | 4.640357143 | 15.08114286 | 53.1881 | 146.535971 | 251 |
| 2.75 | 29.4508 | 4.7641 | 15.48330667 | 53.1881 | 148.113693 | 251 |
| 3 | 27.610125 | 4.872375 | 15.8352 | 53.1881 | 149.4942 | 251 |
| 3.25 | 25.986 | 4.967911765 | 16.14569412 | 53.1881 | 150.712294 | 251 |
| 3.5 | 24.54233333 | 5.052833333 | 16.42168889 | 53.1881 | 151.795044 | 251 |

Thus a series of coating solutions at 5.5% solids with varying R ratios was produced. This was coated onto 7293 label stock (available from 3M Industrial and Converter Systems Division of 3M, 3M Center, Maplewood, Minn. 55144-1000), a label stock comprising Teslin™ SP 700, and adhesive and a liner. However, it is believed the same results are obtained if coated onto Teslin™ SP without adhesive or liner. The samples had varying R ratios but the same approximate coating weight.

The invention is not limited to the above embodiments. The claims follow.

What is claimed is:

1. An inkjet receptor medium, comprising:

a microporous medium having on one major surface an imaging layer comprising a coating of amorphous precipitated silica and binder comprising an ethylene-acrylic acid.

2. The inkjet receptor medium of claim 1, wherein the imaging layer further comprises fumed silica.

3. The inkjet receptor medium of claim 1, wherein the total silica and binder are present in a weight ratio ranging from about 3.5:1 to about 2:1.

4. The inkjet receptor medium of claim 1, wherein the imaging layer has a dried coating weight ranging from about 100 to about 3300 mg/m$^2$.

5. The inkjet receptor medium of claim 1, wherein the imaging layer has a dot diameter increase ranging from about 29 percent to about 104 percent when printing an inkjet ink drop having a volume of about 40 picoliters.

6. The inkjet receptor medium of claim 1, further comprising a pressure sensitive adhesive layer on a major surface opposing the imaging layer.

7. The inkjet receptor medium of claim 6, further comprising a release liner protecting the adhesive layer.

8. The inkjet receptor medium of claim 1, wherein the inkjet receptor medium is calendered.

9. The inkjet receptor medium of claim 8, wherein the inkjet receptor medium has a 85° gloss measurement greater than 15 units.

10. The inkjet receptor medium of claim 1, wherein the imaging layer is water-resistant.

11. The inkjet receptor medium of claim 1, wherein the microporous medium absorbs liquid.

12. The inkjet receptor medium of claim 1, wherein the microporous medium has a pore size of no greater than 10 micrometers.

13. The inkjet receptor medium of claim 1, wherein the microporous medium comprises a hydrophilic microporous polymeric membrane.

14. The inkjet receptor medium of claim 13, wherein the hydrophilic microporous polymeric membrane is selected from the group consisting of polyolefins, polyesters, polyvinyl halides, and acrylics.

15. A method of controlling dot diameter on an inkjet receptor medium, comprising the steps of:

(a) coating an imaging layer on a microporous medium, wherein the layer comprises amorphous precipitated silica and binder comprising an ethylene-acrylic acid, in order to form an inkjet receptor medium; and (b) printing an inkjet ink drop containing pigment particles on the inkjet receptor medium, wherein a dot formed on the medium gains in size on the imaging layer.

16. The method of claim 15, wherein the layer further comprises fumed silica.

17. The method of claim 15, wherein the total silica and binder are present in a weight ratio ranging from about 3.5:1 to about 2:1.

18. The method of claim 15, wherein the imaging layer has a dried coating weight ranging from about 100 to about 3300 mg/$m^2$.

19. The method of claim 15, wherein the imaging layer has a dot diameter increase ranging from about 29 percent to about 104 percent when printing an inkjet ink drop having a volume of about 40 picoliters.

20. The method of claim 15, further comprising providing a pressure sensitive adhesive layer on a major surface opposing the imaging layer.

21. The method of claim 20, further comprising providing a release liner protecting the adhesive layer.

22. The method of claim 15, further comprising before printing step (b), the step of calendering the inkjet receptor medium.

23. The method of claim 22, wherein the calendering step results in the inkjet receptor medium having a 85° gloss measurement of greater than about 15 units.

24. The method of claim 15, wherein the imaging layer is water-resistant.

25. An inkjet imaging process, comprising the steps of printing an inkjet ink on an inkjet receptor medium of claim 1, wherein the ink comprises pigment particles and is dispersed in drops of less than 150 picoliters in volume.

26. The imaging process of claim 25, wherein the pigment particles spread along the inkjet receptor medium to a controlled amount, wherein the controlled amount is determined by a weight ratio of silica/binder and a dried coating weight of the imaging layer.

* * * * *

UNITED STATES PATENT AND TRADEMARK OFFICE

CERTIFICATE OF CORRECTION

PATENT NO. : 6,114,022
DATED : September 5, 2000
INVENTOR(S) : Elizabeth A. Warner and Loren R. Schreader It is certified that error appears in the above-identified patent and that said Letters Patent is hereby corrected as shown below:

Title page,
Item [75], "David Warner" should read -- Elizabeth A. Warner --;
Last line, "5,045,386 9/1991 Stan" should read -- 5,045,386 9/1991 Stan et al. --;
Under Abstract, first line, after "medium" insert -- is disclosed --;

Column 9,
Line 40, (1430 mg/M$^2$)" should read -- (1430 mg/m$^2$) --;
Line 49, "(352 mg/$^2$)" should read -- (352 mg/m$^2$) --; and Column 11,
Line 37, under "Table 1," second column, "35.8135" should read -- 36.8135 --.

Signed and Sealed this

Twenty-third Day of October, 2001

*Attest:*

Nicholas P. Godici

NICHOLAS P. GODICI

*Attesting Officer* *Acting Director of the United States Patent and Trademark Office*